United States Patent [19]

Bäckström et al.

[11] 4,143,260
[45] Mar. 6, 1979

[54] MULTI ELECTRODE TORCH

[75] Inventors: Göran Bäckström, Karlskrona; Orvar Svensson, Täby, both of Sweden

[73] Assignee: Fagersta Aktiebolag, Fagersta, Sweden

[21] Appl. No.: 698,531

[22] Filed: Jun. 23, 1976

Related U.S. Application Data

[63] Continuation of Ser. No. 515,862, Oct. 18, 1974, abandoned.

[30] Foreign Application Priority Data

Oct. 26, 1973 [SE] Sweden .................. 7314537

[51] Int. Cl.$^2$ .................. B23K 9/00
[52] U.S. Cl. .................. 219/121 P; 219/75; 219/137 R
[58] Field of Search ............ 219/121 P, 121 R, 75, 219/76, 130, 137 R, 69 E, 60, 61

[56] References Cited

U.S. PATENT DOCUMENTS

| | | | |
|---|---|---|---|
| 2,960,594 | 11/1960 | Thorpe | 219/121 P |
| 3,050,616 | 8/1962 | Gage | 219/121 P |
| 3,278,720 | 10/1966 | Dixon | 219/125 R X |
| 3,304,460 | 2/1967 | Cargill, Jr. et al. | 219/121 P |
| 3,544,752 | 12/1970 | Lenhnert et al. | 219/61 X |
| 3,553,422 | 1/1971 | McCoy | 219/121 P |
| 3,562,486 | 2/1971 | Hatch | 219/121 P |
| 3,567,898 | 3/1971 | Fein | 219/121 P |
| 3,575,568 | 4/1971 | Tateno | 219/75 |
| 3,660,630 | 5/1972 | Sunnen et al. | 219/76 |
| 3,690,567 | 9/1972 | Borneman | 219/121 P |
| 3,788,703 | 1/1974 | Thorpe | 219/75 |

FOREIGN PATENT DOCUMENTS

4025402 11/1970 Japan .................. 219/121 P

*Primary Examiner*—J. V. Truhe
*Assistant Examiner*—M. Paschall
*Attorney, Agent, or Firm*—Lerner, David, Littenberg & Samuel

[57] ABSTRACT

A multi-electrode welding apparatus is provided which includes a torch body and a least two electrodes, preferably of the non-consumable type, which are adjustably mounted in the torch body so as to be vertically positionable with respect to a workpiece and a nozzle mounted in the torch body. Interchangeable nozzles are provided for the electrodes, each nozzle being removably and interchangeably mounted in the torch body and adapted to be employed in conjunction with either of the electrodes so that one of the nozzles in conjunction with one electrode provides an open arc between such electrode and the workpiece, and another of the nozzles employed in conjunction with the other electrode provides a constricted arc between such electrode and the workpiece.

7 Claims, 1 Drawing Figure

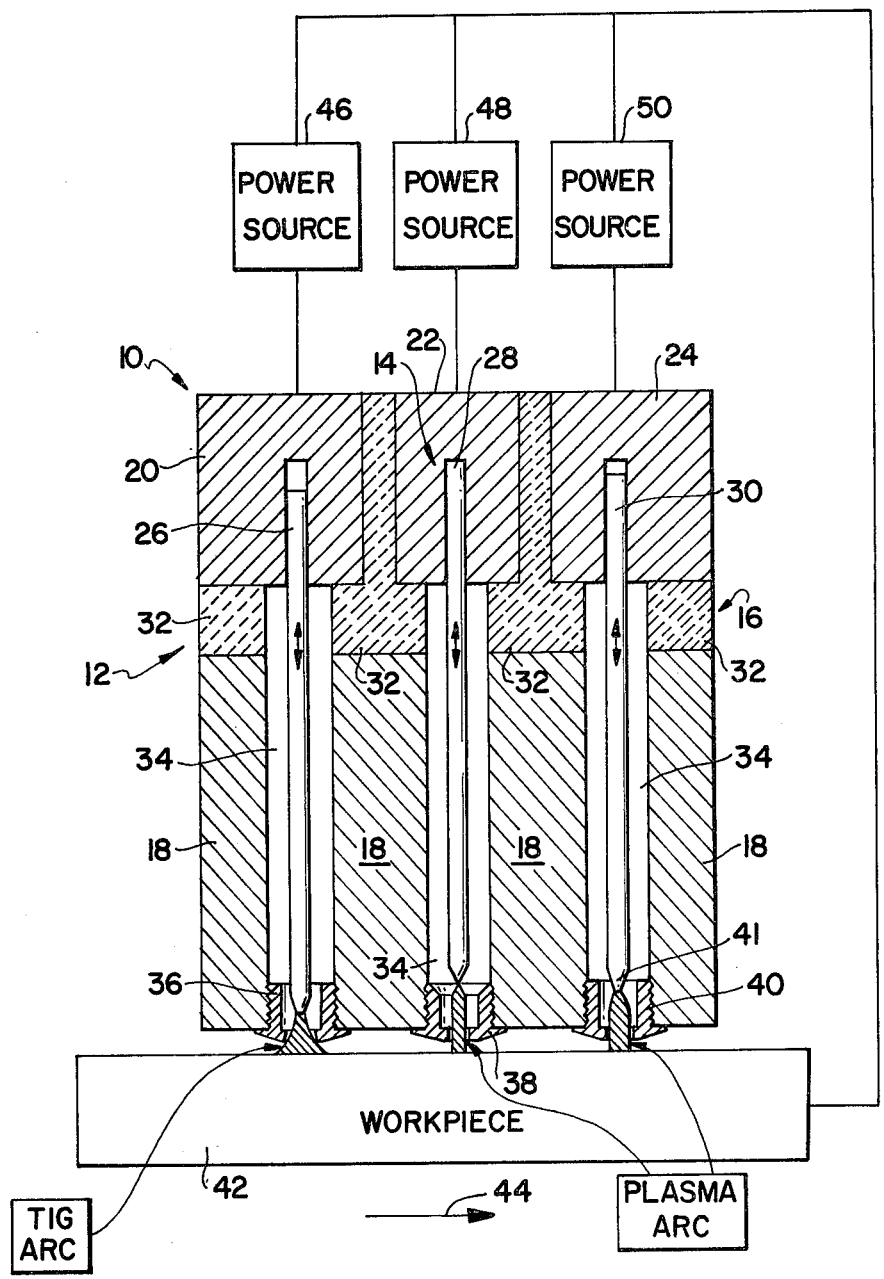

MULTI ELECTRODE TORCH

This is a continuation of application Ser. No. 515,862, filed Oct. 18, 1974 now abandoned.

FIELD OF THE INVENTION

The present invention relates to a welding apparatus comprising a multi-electrode torch which includes a torch body having at least two vertically positionable electrodes and cooperating interchangeable nozzles which provide dissimilar arcs. Such a welding apparatus facilitates control of energy transfer to the workpiece to obtain fast, high quality welds.

BACKGROUND OF THE INVENTION

Until now, high-productive welding techniques, such as employed in the production of stainless steel tubes, have been carried out employing two or more non-consumable type electrodes in a single torch body, each electrode including a protective nozzle encircling the same. The arc established between each of the electrodes and the workpiece, by use of the above welding apparatus, is of the so-called open arc or TIG-arc type, that is, the wall of the nozzle has no influence on the arc so that an unrestricted or open arc is obtained. Due to the nature of the TIG-arc, the heat transfer from the electrode to the workpiece is effected through the upper side of the molten pool (added filler material), which results in a shallow penetration profile. Furthermore, welding with such a multi-electrode torch of the TIG type produces a wide molten weld pool and consequently there is a high consumption of energy per unit length of weld lead. Moreover, in a TIG-torch the electrode is rather unprotected, for which reason impurities from the surrounding air and from the motlen pool can easily be conducted into the inert gas surrounding the electrode. This gives an increased wearing of the electrode. When this wearing has reached a certain stage, the electrode must be taken out from the torch to be re-ground.

BRIEF STATEMENT OF THE INVENTION

In accordance with the present invention, there is provided a multi-electrode torch which overcomes the disadvantages associated with prior art multi-electrode torches and the use of which makes it possible to control energy transfer to the workpiece in an optimal manner, so as to avoid the formation of a wide molten zone or weld pool. In this manner, the risk of weld defects such as hot tears is reduced and welding speed is increased. Furthermore, the electrode in the multi-electrode torch of the invention are disposed relative to the torch body so that such electrodes are well protected from the surrounding air and molten metal, whereby a long electrode working life can be achieved before the electrodes need be removed for re-grinding.

The multi-electrode welding apparatus of the invention includes a torch body, at least first and second non-consumable electrodes adjustably mounted in the torch body for vertical positioning therein with respect to a workpiece, and at least first and second interchangeable nozzles, each nozzle being removably and interchangeably mounted in the torch body and adapted to be employed in conjunction with either of the electrodes to operate as either a TIG-torch to provide an open arc or a plasma torch to provide a constricted arc.

According to United States welding terminology, a "plasma torch" usually denotes a torch by which a non-transferred arc is created, i.e., the nozzle serves as one of the electrodes, a power source being coupled between the nozzle and the electrode. However, as used herein, the terms TIG-torch and plasma torch are used in accordance with European welding terminology and both refer to torches wherein arcs of the transferred type are created, the transferred arc created by the plasma torch being relatively more constricted than that created by the TIG torch. In a preferred embodiment of the multi-electrode welding apparatus of the invention, at least three electrodes and three interchangeable nozzles are provided, one nozzle for each electrode, so that the arcs between the electrodes and the workpiece comprises an open arc, a constricted arc, or an arc constricted to a lesser degree than said constricted arc.

BRIEF DESCRIPTION OF THE DRAWING

The accompanying FIGURE is a schematic representation of a preferred embodiment of the multi-electrode torch of the invention.

DETAILED DESCRIPTION OF THE DRAWING

Referring now to the accompanying FIGURE, there is shown a multi-electrode torch welding appratus in accordance with the present invention and identified generally by the numeral 10 which is comprised of three torches generally indicated by the numerals 12, 14 and 16, arranged in a row in the longitudinal direction of the weld bead, as shown, and protected from the surrounding atmosphere by the torch body 18 as shown. The multi-electrode torch 10, as shown, includes electrode holders 20, 22 and 24 in which electrodes 26, 28 and 30, respectively, (preferably of the non-consumable type) are adjustably mounted for vertical positioning in such electrode holders. The electrodes 26, 28 and 30 are also arranged to be mutually displaceable in the longitudinal direction of the weld head. An insulating material 32, such as a ceramic material, is disposed between the torch body 18 and the electrode holders 20, 22 and 24. The torch body 18 and electrode holders 20, 22 and 24 and insulating material, in effect, surround the electrodes 26, 28 and 30 and insulate them from the surrounding atmosphere.

A duct 34 in the form of a bore in the torch body 18 surrounds each of the electrodes 26, 28 and 30. The duct 34 functions as an enveloper gas inlet.

Interchangeable nozzles 36, 38 and 40 are mounted in the torch body 18, as shown. Nozzle 36 encircles the electrode 26 and functions only to protect the torch body 18 and thus does not influence the arc produced between the electrode 26 and the workpiece 42. Thus, in effect, the electrode 26 in conjunction with the nozzle 36 comprises a TIG torch and produces a TIG or open arc. The nozzle 38 cooperating with the electrode 28 is a plasma nozzle which forms a constricted arc. The nozzle 40 cooperating with the electrode 30 is designed to form a less constricted arc; thus the tip 41 of the electrode 30 is adjusted to be within the duct of the nozzle 40. The nozzles are interchangeable as indicated above so that, for example, the nozzle 36 can be replaced with the plasma nozzles 38 or 40. Furthermore, the electrodes 26, 28 and 30 are displaceable so that each may be positioned at a suitable distance with respect to its cooperating nozzle.

The multi-electrode torch of the invention functions as follows:

The workpiece 42 is placed under the torch body 18, which workpiece is adapted to move in the direction of the arrow 44. The electrodes 26, 28 and 30 are connected to separate power sources 46, 48 and 50, respectively, which are also connected to the workpiece 42, as shown. Thus, the flow of current to each of the electrodes may be individually controlled. In addition, flow of enveloper gas to each of the ducts 34 surrounding each electrode is preferably individually controlled. The means to supply the enveloper gas, not shown in the Drawing, may be of any conventional type such as shown in U.s. Pat. No. 3,050,616.

Each of the electrodes 26, 28 and 30 is designed to provide an open arc, a so-called constricted arc or a more or less constricted arc depending upon the nozzle that is employed and the position of the electrode with respect to such nozzle. Thus, the arc produced by the electrode 26-nozzle 36 arrangement is the so-called open arc, that is, the wall of the nozzle has no influence on the arc. The arc produced by the electrode 28-nozzle 38 arrangement is a plasma arc or a so-called constricted arc, that is, the wall of the nozzle keeps the arc constricted to a thin pencil. The arc produced by the electrode 30-nozzle 40 arrangement is a less constricted plasma arc than the last-mentioned arc, since the wall of the nozzle 40 will only have a weak influence on the arc. The constricted arc is preferred in welding sheet metal because of the key-hole effect of the arc which allows for a greater part of the energy transfer from the arc to take place within the metal, so that a penetration profile with a high depth-width ratio is obtained.

It will be appreciated that with the multi-electrode torch of the invention as described above, any one of the above types of arcs can be chosen for each and every electrode. Thus, in the embodiment shown in the accompanying FIGURE, 27 different variants of arc combinations can be obtained.

The welding device is not limited to the described design but a number of variants of torch combinations are, as has been mentioned, possible within the scope of the invention. For example, the device may include two, three, four or more electrodes and a corresponding number of cooperating nozzles of varying types as described above, all of which electrodes operate at the same time and move along the length of the weld bead.

It will also be appreciated that the electrodes, nozzles, electrode holders, power source, insulators and the like are of conventional construction and may be easily selected by one skilled in the art for use in welding apparatus of the invention.

What is claimed is:

1. Welding apparatus comprising a torch body, at least first and second non-consumable electrodes, means for adjustably mounting said electrodes in said torch body for vertical positioning therein with respect to each other and to a workpiece, at least first and second mutually interchangeable nozzles, means for removably and interchangeably mounting said nozzles in said torch body, said nozzles being adapted to be employed in conjunction with either of said electrodes, and wherein said first nozzle in conjunction with either one of said electrodes is constructed to provide an open arc between said electrode and said workpiece, and said second nozzle in conjunction with the other of said electrodes is constructed to provide a constricted arc between said electrode and said workpiece.

2. The welding apparatus as defined in claim 1 wherein said electrodes and their associated nozzles are arranged to be mutually displaceable in the longitudinal direction of a weld bead.

3. The welding apparatus as defined in claim 1 further comprising at least a third electrode including means to adjustably mount said third electrode in said torch body for vertical positioning therein, and a third interchangeable nozzle including means to removably and interchangeably mount said third nozzle in said torch body said nozzle being adated to be employed in conjunction with any one of the first, second or third electrodes and constructed to provide an arc between said electrode and said workpiece which is more constricted than the arc obtained employing said second nozzle.

4. The welding device as defined in claim 1 further comprising separate individually controlled power sources in communication with each electrode and the workpiece.

5. The welding device as defined in claim 1 further comprising means for individually controlling the flow of enveloper gas to each electrode.

6. The welding apparatus as defined in claim 1 further comprising at least a third electrode including means to adjustably mount said third electrode in said torch body for vertical positioning therein, and a third interchangeable nozzle including means to removably and interchangeably mount said third nozzle in said torch body said nozzle being adapted to be employed in conjunction with any one of the first, second or third electrodes and constructed to provide an arc between said electrode and said workpiece which is less constricted than the arc obtained employing said second nozzle.

7. The welding device as defined in claim 1 wherein said first and second nozzles have inner configurations, said inner configuration of said first nozzle being different than said inner configuration of said second nozzle so that said first nozzle in conjunction with one of said electrodes provides an arc which is different from the arc provided by said second nozzle in conjunction with the other of said electrodes.

* * * * *